Figures 1, 2:
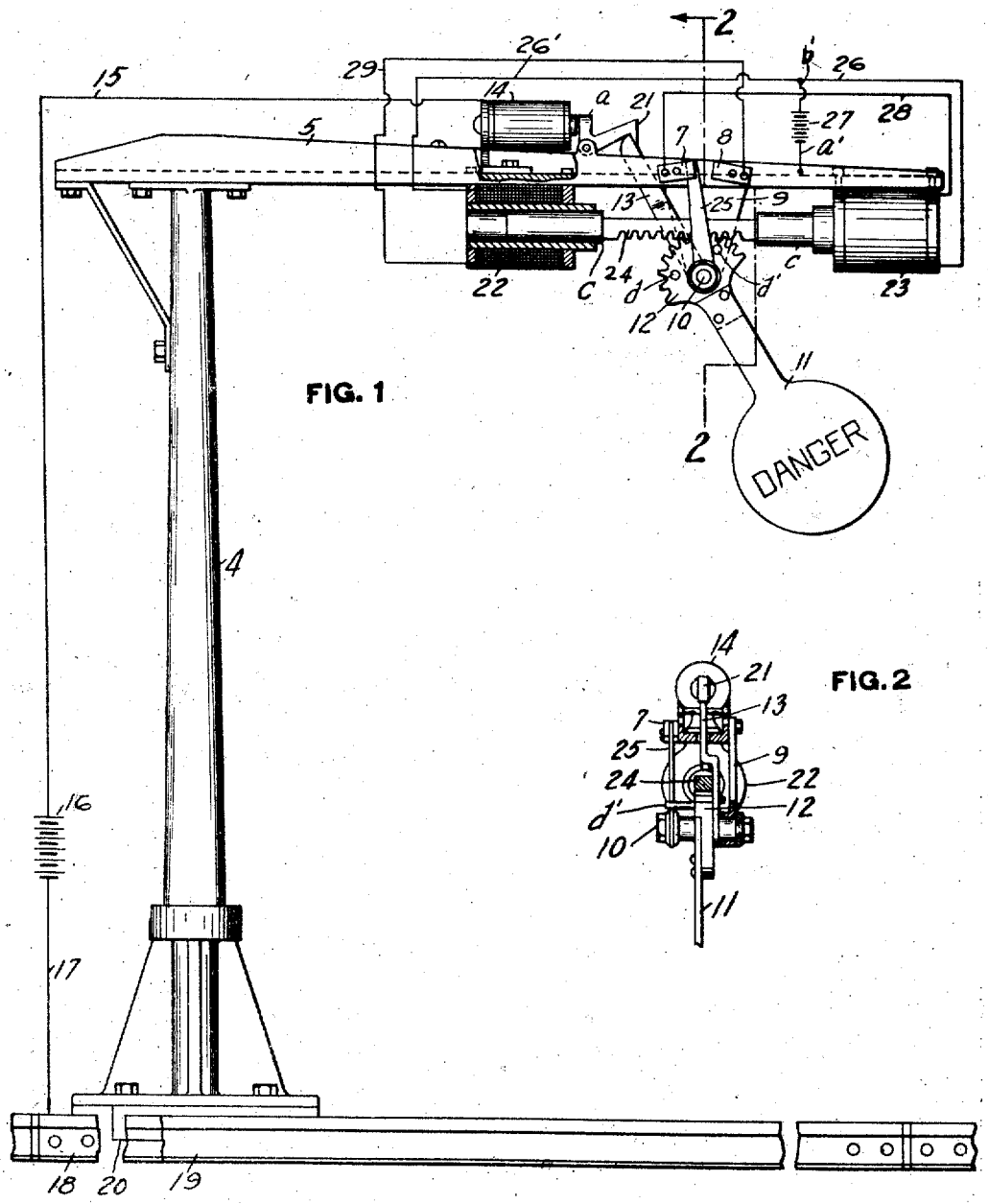

R. E. DRISCOLL.

RAILWAY CROSSING SIGNAL.

APPLICATION FILED APR. 24, 1917.

Reissued Jan. 11, 1921

15,023.

2 SHEETS—SHEET 1.

WITNESSES

Edwin S. Pruce

Herman Wagner

INVENTOR

Robert E. Driscoll, by A. L. Ferrill,

His Attorney

R. E. DRISCOLL.

RAILWAY CROSSING SIGNAL.

APPLICATION FILED APR. 24, 1917.

Reissued Jan. 11, 1921.

15,023.

2 SHEETS—SHEET 2.

WITNESSES

Edwin D. Jones

A. Herman Wagner.

INVENTOR

Robert E. Driscoll, by A. L. Vencill

His attorney

UNITED STATES PATENT OFFICE.

ROBERT E. DRISCOLL, OF OMAHA, NEBRASKA, ASSIGNOR TO THE UNION SWITCH & SIGNAL COMPANY, OF SWISSVALE, PENNSYLVANIA, A CORPORATION OF PENNSYLVANIA.

RAILWAY-CROSSING SIGNAL.

15,023. Specification of Reissued Letters Patent. Reissued Jan. 11, 1921.

Original No. 1,182,152, dated May 9, 1916, Serial No. 856,359, filed August 12, 1914. Application for reissue filed April 24, 1917. Serial No. 164,286.

*To all whom it may concern:*

Be it known that I, ROBERT E. DRISCOLL, a citizen of the United States, residing at Omaha, in the county of Douglas and State of Nebraska, have invented certain new and useful Improvements in Railway-Crossing Signals, of which the following is a specification.

This invention relates to railway crossing signals, and has for its objects to provide means for warning the occupants of vehicles or others passing on a highway of the near proximity of railway trains, said means to consist of few and simple parts, so that manufacture may be economical and which will be efficient and durable in use.

With the foregoing objects in view and others to be mentioned, the invention presents a novel construction, combination and arrangement of parts as described herein and claimed, and as illustrated in the drawing, wherein,—

Figure 3:
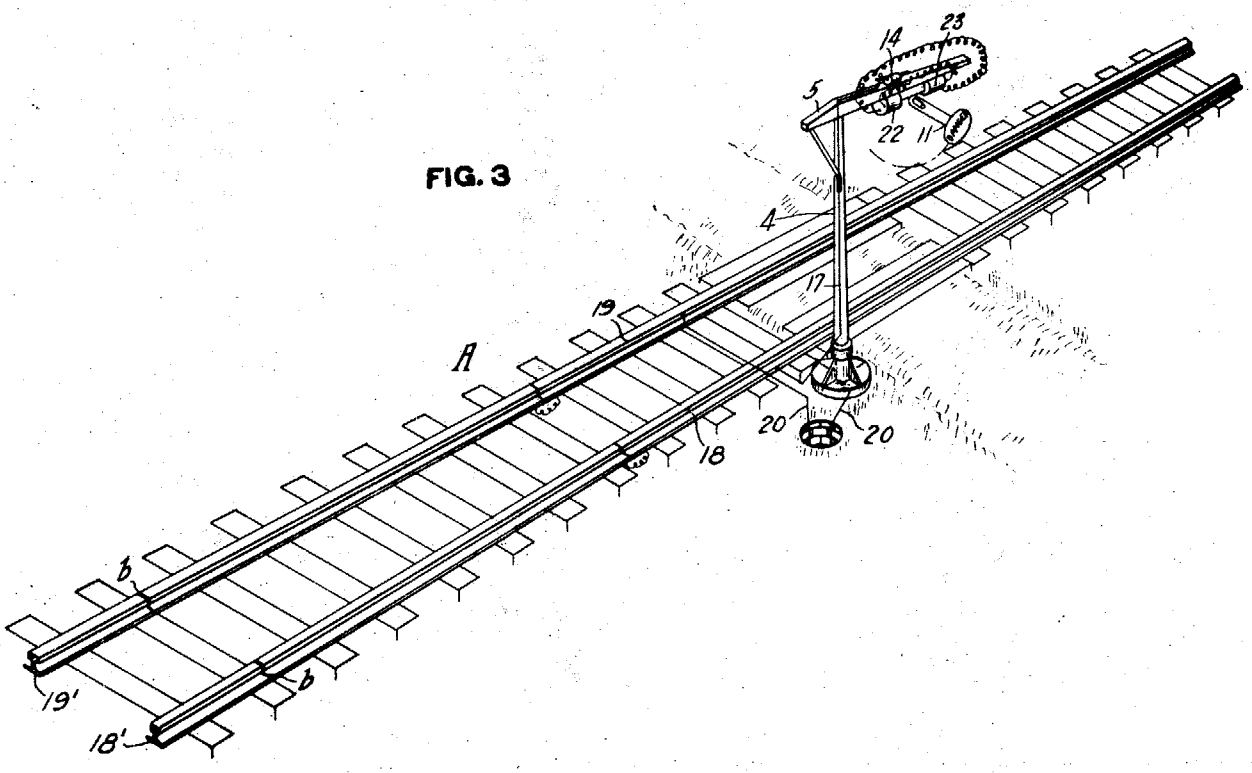

Figure 1 is a diagrammatic view of the electrical conductors and a partly broken view in side elevation of a signal, embodying the invention, parts thereof being in section. Fig. 2 is a partly broken, transverse section on line 2—2 of Fig. 1. Fig. 3 is a perspective view showing relative position of parts and the electrical conductors connected with the track.

Referring now to the drawing for a more particular description, numeral 4 indicates a metallic post disposed adjacent to a railway crossing and provided with a metallic, transverse arm 5 preferably having a length sufficient to be disposed above the crossing. This arm is provided, intermediate its ends, with a pair of insulated brackets or contact-plates indicated, respectively, at 7 and 8.

Carried by arm 5 and projecting below the brackets is a stationary, metallic supporting plate 9, upon which, by means of the pivot pin 10, the signal or pendulum 11 is mounted, said pendulum being provided, inwardly of the mounting, with the toothed sector 12 and a latch-arm 13, normally in engagement with the catch 21 of the armature *a*.

Mounted on arm 5 is an electromagnet 14 provided with a conductor 15 communicating with the battery 16. At 17 is an electrical conductor connecting the battery 16 with one of the track rails 18 (Fig. 3), the adjacent track rail 19 being provided with an electrical conductor 20 in contact with the post 4. It will be understood that the metallic parts of a locomotive or train, which may enter upon the track rails 18 and 19 will operate to close the circuit provided by conductors 17 and 18, in a manner to energize the electromagnet 14, for causing the catch 21 of armature *a* to be disengaged from arm 13 of the pendulum, the track rails 18 and 19 being insulated, as indicated at *b*, from the track rails 18′ and 19′ to form the block A shown in Fig. 3.

In order that the pendulum may have swinging movements while the train is upon the block A, the solenoids 22 and 23 are employed and are mounted, preferably, upon the lower side of arm 5, their cores *c* being provided with the rack bar 24 extending therebetween in engagement with the teeth of the sector 12, the solenoids being disposed substantially equi-distant from the respective contact plates 7 and 8.

At 25 is indicated a contact finger. It is adapted to have swinging movements to move into alternate engagement with the contact plates 7 and 8 while mounted at its lower end upon the pivot pin 10 when forcibly moved by the projections or lugs *d* and *d′* which extend outwardly from the sector, as best shown in Fig. 2.

At 26 is indicated a conductor electrically energized by the battery 27 having a conductor *a′* connected with the metallic arm 5, as shown in the drawing, a conductor *b′* connecting this battery with the conductor 26, said conductor together with the conductor 26′ connecting the two solenoids, as shown. At 28 is a conductor connecting the solenoid 23 with contact plate 7. At 29 is a conductor connecting the solenoid 22 with contact plate 8, and when arm 13 is released from the catch 21, the rack bar will move in the direction of the solenoid 23 for the reason that when the contact finger 25 is in engagement with the plate 7 a circuit is completed from the battery 27 through the conductors *b′* and 26, solenoid 23, conductor 28, contact plate 7, finger 25, thence through the metallic parts 10, 9 and 5, and wire or conductor *a′* to said battery 27.

The swinging movement of the signal toward the post will cause engagement of the projection *d* with the contact finger 25 and move said finger into engagement with contact plate 8, said engagement causing a movement of the rack bar in a reverse direction, or toward the solenoid 22, for the reason that when the contact finger 25 is in engagement with plate 8 the circuit is established for battery 27 through conductors $b'$, $26'$ to solenoid 22, conductor 29 and thence to the battery 27 through contact plate 8, finger 25, the metallic parts 10, 9 and 5 and conductor $a'$; and the swinging movements of the signal will be continued until the train leaves the block A. It will be understood that when the train leaves block A, the electrical circuit between conductors 18 and 20 will be broken, and the swinging movements of the signal will cease, for the reason that its arm 13 will be caught by the catch 21, the armature $a$ being released and adapted to swing downwardly for engagement with said arm, as shown in Fig. 1 of the drawing.

Among some of the advantages to be derived by use of the invention, it may be stated that the parts employed in the construction are few, thereby conducing to economy in manufacture. The normal tendency of the pendulum is to be constantly moving, its movements being terminated by the train leaving the block A, and remaining at rest until another train enters said block. The normal tendency of the armature of the electromagnet is to be in engagement with the latch arm of the pendulum and to remain in such engagement until a train enters the block A. It is considered that the disclosure shows the parts to be effective in operation for the purposes described, and that the parts will be durable in wear.

Having fully described the invention, what I claim and desire to secure by Letters Patent is:

1. A highway crossing signal comprising a pendulum-like visual warning member biased to an intermediate position, two electromagnets for causing repeated oscillation of said member about said intermediate position, means controlled by said pendulum for alternately energizing said electromagnets, means for latching said member in an inclined position in opposition to the biasing force acting on the member, and a third electromagnet for controlling said latching means.

2. A highway crossing signal comprising a pendulum-like visual warning member biased to an intermediate position, means for causing repeated oscillation of said member about said intermediate position, a pawl carried by said member, a latch adapted to engage said pawl to hold said member in an inclined position in opposition to the biasing force acting on the member, and an electro-magnet for controlling said latch.

3. In combination, a signal member biased to an intermediate position, electromagnetic means for causing repeated oscillation of said signal member about said intermediate position to indicate danger, a circuit controller operated by said signal member for controlling said electromagnetic means, means for locking said signal member in an extreme position in opposition to the biasing force acting on the member, and an electromagnet for controlling said last-mentioned means.

4. A railway crossing signal, comprising, in combination with a support, a pair of electrically connected, oppositely disposed solenoids on the support, a rack bar connecting the cores of the solenoids, a pair of contact plates on the support disposed in a plane substantially midway between the solenoids, each contact plate being electrically connected with a solenoid, a pivotally mounted pendulum having a latch arm and provided with a sector in engagement with the rack bar and having a contact finger normally in engagement with one of said contact plates, an electromagnet provided with a circuit and having an armature provided with a catch for engagement with the latch arm of the pendulum when the circuit is opened.

5. A signal comprising a pendulum-like warning member biased to an intermediate position, means for causing said member to oscillate continuously about said intermediate position through an arc of definite amplitude to give one indication, and means for retaining said member at substantially one end of said arc to give another indication.

6. A signal comprising a pendulum-like warning member biased to an intermediate position, electrically controlled means for causing said member to oscillate continuously about said intermediate position through an arc of definite amplitude, and means for retaining said member at substantially one end of said arc to give another indication.

7. A highway crossing signal comprising a pendulum-like warning member biased to an intermediate position, means for causing said member to swing to and fro continuously about said intermediate position to give an indication, and means for retaining said member in an inclined position to give a different indication, said latter means comprising a pawl operatively connected with the member and periodically moved thereby into retaining position, and an electromagnetic device for controlling said pawl.

8. A highway crossing signal comprising a pendulum-like visual warning member biased to an intermediate position, means for causing said member to swing to and fro continuously to give one indication, and means for retaining the member in an inlined position in opposition to the biasing force acting thereon to give a different indication, said latter means comprising an electromagnet and a pawl which oscillates with the member.

9. A highway crossing signal comprising a pendulum-like warning member biased to an intermediate position, means for causing repeated oscillation of said member about said intermediate position, and mechanism for retaining said member in an inclined position including a part moved into operative position at periodic intervals by said oscillating means and electromagnetic means for controlling said part.

10. A signal comprising a pendulum-like warning member biased to an intermediate position, means for causing said member to swing to and fro about said intermediate position to give one indication, and electromagnetic means for retaining said member in an inclined position to give a different indication, said latter means comprising a fixed part and a part operatively connected with said member and movable thereby toward said fixed part.

11. A signal comprising a pendulum-like visual warning member biased to an intermediate position, means for causing said member to oscillate about said intermediate position, a pawl operatively connected with the member to oscillate therewith, and electromagnetically controlled means for holding said pawl to latch the member in an inclined position in opposition to the biasing force acting thereon.

In testimony whereof I affix my signature in presence of two witnesses.

ROBT. E. DRISCOLL.

Witnesses:
F. W. Pfleging,
Geo. Marloff.